May 12, 1953 E. L. CONDRA 2,638,320
PIPE CUTTER OR REAMER FOR USE ON CROOKED PIPE
Filed June 18, 1949

INVENTOR.
ELMO L. CONDRA,
BY
ATTORNEY.

Patented May 12, 1953

2,638,320

UNITED STATES PATENT OFFICE 2,638,320

PIPE CUTTER OR REAMER FOR USE ON CROOKED PIPE

Elmo L. Condra, Long Beach, Calif.

Application June 18, 1949, Serial No. 99,998

2 Claims. (Cl. 255—1)

In oil wells where a casing is used to prevent the formation from filling the hole and where horizontal or lateral movement of the formation occurs, the casing is bent or curved in a horizontal plane due to this lateral shifting of the formation. When the casing is thus curved or bent, it is necessary to straighten the hole as much as possible and this is accomplished by cutting out one side of the casing and then inserting a liner, thus eliminating any abrupt angle or curve in the pipe and straightening the pipe to a degree necessary to subsequently insert tools into the well.

An object of my invention is to provide a pipe cutter or reamer which will cut through one side of the pipe or casing and which is effectively guided while so cutting or reaming the pipe.

Another object of my invention is to provide a novel pipe cutter or reamer of the character stated, in which the cutter or reamer is slidably guided on a mandrel which engages the pipe.

Still another object of my invention is to provide a novel pipe cutter or reamer of the character stated, in which a mandrel is slidably mounted in the cutter or reamer, this mandrel successively engaging the pipe as the tool is lowered in the pipe.

A feature of my invention resides in the novel pipe cutter or reamer which will effectively hold the cutting member in contact with the pipe so that this cutting member will cut entirely through the pipe on one side thereof.

Other objects, advantages and features of invention may appear from the accompanying drawing, the subjoined detailed description and the appended claims.

Figure 1:
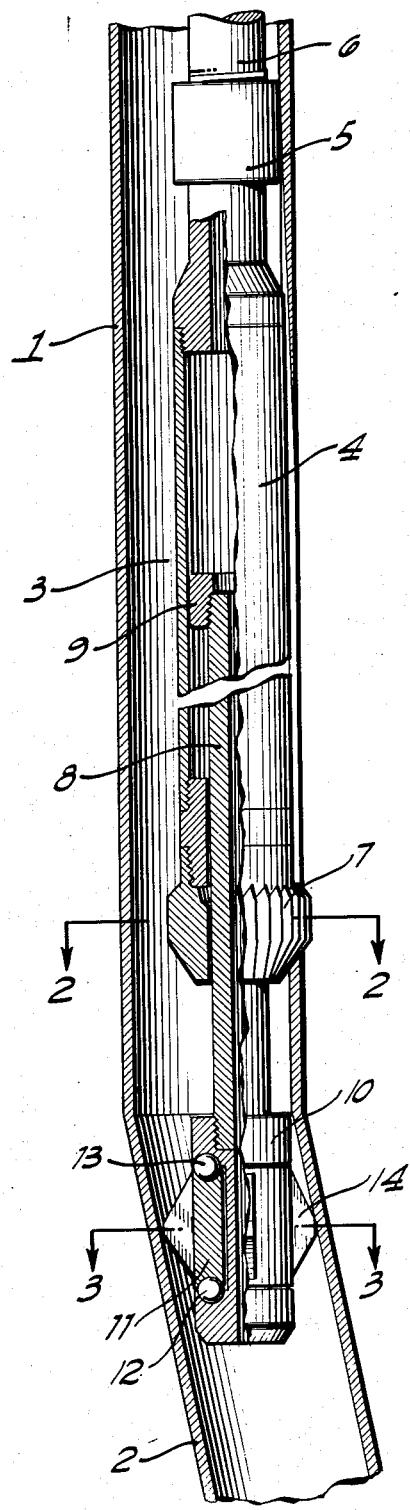
Figure 1 is a longitudinal sectional view of my pipe cutter or reamer.

Referring more particularly to the drawing, the numeral 1 indicates the pipe or casing, which is usually run into an oil well and due to lateral shifting of the formation this casing is bent or curved, as shown at 2. This bend or curve is normally rather abrupt and to run tools subsequently into the casing, it is necessary to straighten this abrupt bend or curve. I accomplish this by cutting through the casing on the inside of the curve or bend so that a sleeve may be subsequently lowered into the casing and cemented in place, in the usual and well known manner.

Figure 2:
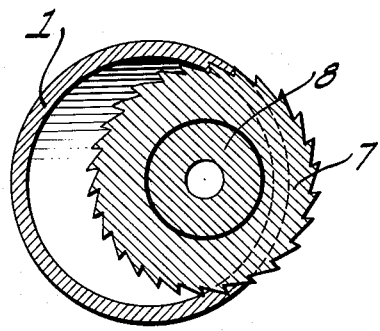
Figure 2 is a sectional view taken on line 2—2 of Figure 1.
Figure 3:
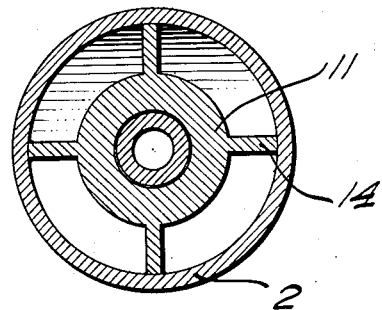
Figure 3 is a sectional view taken on line 3—3 of Figure 1.

My pipe cutter or reamer 3 consists of an elongated tube 4 on the upper end of which a sub or coupling 5 is provided and into which the drill pipe 6 is threaded. A circular cutter 7 is fixedly mounted on the lower end of the tube 4 and this cutter when pressed against the casing 1 will cut through the wall of this casing and especially on one side, as shown in Figure 2. When the casing is thus cut away, a liner can be driven into the casing and positioned in the area where the bend 2 occurs.

To hold the cutter 7 against the casing while it is cutting and also to guide this cutter in its vertical movement, I provide a mandrel 8, which extends through the cutter 7 and into the tube 4. A guide block 9 on top of the mandrel closely fits the bore of the tube 4, thus acting as a guide for the tube 4, as the tube moves downwardly and as the cutter 7 cuts through the wall of the casing 1. The mandrel 8 is preferably hollow so that circulating fluid can pass through it.

A head 10 is mounted on the lower end of the mandrel 8 and this head is provided with a sleeve 11, which rotates on the head and is preferably provided with thrust bearings 12—13, so that it will rotate easily. A plurality of wings 14 project laterally from the sleeve 11 and these wings will engage the pipe substantially as shown in Figure 1.

Operation

When the wings engage the pipe they prevent the head 10 from moving downwardly and thus hold the mandrel 8 stationary. The tube 4 and the cutter 7 will thus advance over the mandrel 8 and will be guided thereby. Furthermore, since the mandrel 8 is fixedly held in position it will hold the cutter 7 tightly against the wall of the pipe 1, thus enabling the cutter to cut through this pipe. When the cutter 7 reaches the head 10, the tool is lifted which permits the mandrel 8 to drop downwardly and again the tool is lowered until the wings 14 again bend in the pipe and again the cutter 7 is rotated to continue to sever the pipe.

Having described my invention, I claim:

1. A pipe cutter or reamer to cut through one side of pipe, comprising a tube, pipe coupling means on the upper end of said tube, an annular cutter fixedly mounted on the lower end of said tube, radially projecting cutter teeth on said cutter, a mandrel projecting from the bottom of said tube and slidable longitudinally therein, spaced shoulders in the tube engageable by the mandrel on longitudinal movement thereof to limit upward and downward movement of the mandrel within the tube, a head fixedly mounted on the lower end of said mandrel, an annular sleeve rotatably mounted on said head, and radially projecting wings on said sleeve.

2. A pipe cutter or reamer to cut through one side of pipe, comprising a tube, pipe coupling means on the upper end of said tube, an annular cutter fixedly mounted on the lower end of said tube, radially projecting cutter teeth on said cutter, a mandrel projecting from the bottom of said tube and slidable longitudinally therein, spaced shoulders in the tube engageable by the mandrel on longitudinal movement thereof to limit upward and downward movement of the mandrel within the tube, a head fixedly mounted on the lower end of said mandrel, an annular sleeve rotatably mounted on said head, and radially projecting wings on said sleeve, and thrust bearings in said head, said bearings engaging the top and bottom of the sleeve.

ELMO L. CONDRA.

References Cited in the file of this patent

UNITED STATES PATENTS

| Number | Name | Date |
|---|---|---|
| 2,014,805 | Hinderliter | Sept. 17, 1935 |
| 2,072,320 | Thomas | Mar. 2, 1937 |
| 2,218,766 | Parker | Oct. 22, 1940 |
| 2,299,528 | Conner | Oct. 20, 1942 |
| 2,538,545 | Whitehead et al. | Jan. 16, 1951 |

FOREIGN PATENTS

| Number | Country | Date |
|---|---|---|
| 617,740 | Great Britain | Feb. 10, 1949 |